United States Patent
Vauclair et al.

(10) Patent No.: US 8,813,188 B2
(45) Date of Patent: Aug. 19, 2014

(54) SECURE PAIRING FOR WIRED OR WIRELESS COMMUNICATIONS DEVICES

(75) Inventors: Marc Vauclair, Leuven (BE); Javier Serret Avila, Brussels (BE); Lionel Georges Etienne, Leuven (BE); Philippe Teuwen, Leuven (BE)

(73) Assignee: Koninklijke Philips N.V., Eindhoven (NL)

(*) Notice: Subject to any disclaimer, the term of this patent is extended or adjusted under 35 U.S.C. 154(b) by 1116 days.

(21) Appl. No.: 11/574,758

(22) PCT Filed: Aug. 31, 2005

(86) PCT No.: PCT/IB2005/052854
§ 371 (c)(1),
(2), (4) Date: Mar. 6, 2007

(87) PCT Pub. No.: WO2006/027725
PCT Pub. Date: Mar. 16, 2006

(65) Prior Publication Data
US 2008/0320587 A1    Dec. 25, 2008

(30) Foreign Application Priority Data
Sep. 8, 2004 (EP) .................... 04104326

(51) Int. Cl.
*H04L 29/06* (2006.01)
(52) U.S. Cl.
CPC ............ *H04L 63/0873* (2013.01); *H04L 63/08* (2013.01)
USPC .................................... 726/3; 726/5
(58) Field of Classification Search
CPC ..................................... H04L 63/08
USPC ........................................ 726/3, 17, 5
See application file for complete search history.

(56) References Cited

U.S. PATENT DOCUMENTS 6,772,331 B1 * 8/2004 Hind et al. ............... 713/151
2003/0065952 A1    4/2003 Otsuka
(Continued)

FOREIGN PATENT DOCUMENTS

| CN | 1444386 A | 9/2003 |
| EP | 0600695 A2 | 6/1994 |

(Continued)

OTHER PUBLICATIONS

Written Opinion of the International Searching Authotiy PCT/IB2005/052584.
(Continued)

*Primary Examiner* — Jeffrey Pwu
*Assistant Examiner* — Thong Truong

(57) ABSTRACT

Pairing is achieved between a host communications device and a peripheral communications device, in order to establish an ad hoc wireless or wired network. A device identification, relating uniquely to the peripheral device, is displayed on the host device. In order to accept the pairing, the user confirms that the device identification displayed on the host device matches that printed on the peripheral device, and then completes the pairing procedure by pressing a key on the peripheral device, or, if Near Field Communication (NFC) techniques are implemented in the devices, by placing the peripheral device in contact with, or sufficiently close to, the host device. Thus, secure pairing is achieved, without requiring a complex user interface on the peripheral device.

48 Claims, 7 Drawing Sheets

(56) References Cited

U.S. PATENT DOCUMENTS

| | | |
|---|---|---|
| 2003/0086388 A1 | 5/2003 | Peters |
| 2003/0095521 A1 | 5/2003 | Haller et al. |
| 2003/0104848 A1 | 6/2003 | Bridgeglall |
| 2004/0067736 A1 | 4/2004 | Kamma |
| 2004/0132407 A1 | 7/2004 | Hein-Magnussen et al. |
| 2004/0203384 A1* | 10/2004 | Sugikawa et al. ............ 455/41.2 |
| 2004/0257202 A1* | 12/2004 | Coughlin et al. ............ 340/5.82 |
| 2005/0208983 A1* | 9/2005 | Khoo ........................ 455/575.1 |
| 2005/0234307 A1* | 10/2005 | Heinonen et al. ............ 600/300 |
| 2010/0285749 A1 | 11/2010 | Annola et al. |

FOREIGN PATENT DOCUMENTS

| | | |
|---|---|---|
| EP | 0600695 B1 | 6/1994 |
| JP | 2003500923 A | 1/2003 |
| WO | 0072506 A1 | 11/2000 |
| WO | 2004025921 A2 | 3/2004 |
| WO | 2004036467 A1 | 4/2004 |
| WO | 2004064339 A2 | 7/2004 |

OTHER PUBLICATIONS

ISR, International Search Report WO2006/027725A1.

* cited by examiner

SECURE PAIRING FOR WIRED OR WIRELESS COMMUNICATIONS DEVICES

The invention relates to wired and wireless communications devices and in particular relates to a method and apparatus for allowing secure pairing of wired or wireless communications devices.

Ad hoc wireless networks are becoming common, in which suitably equipped wireless devices can communicate with each other wirelessly, avoiding the need to connect the two devices by means of a cable.

In order for the two separate wireless devices to communicate securely with each other, and avoid the possibility that data transmitted from one of the devices can be detected and/or tampered with by a device owned by a third party, it is necessary to 'pair' the devices. This pairing process involves the communication and establishment of 'trust-foundation' information between the devices involved. This 'trust-foundation' information has the role of ensuring that devices can only communicate with communication peers that the user designates as trusted (for example because the user owns or controls the peer device).

There are several wireless communication standards, such as Bluetooth and IEEE 802.11b/g, and each contains a mechanism for device pairing. These mechanisms involve either the user typing a series of symbols (for example decimal digits for Bluetooth, hexadecimal or ASCII characters for IEEE 802.11b's Wireless Equivalent Privacy (WEP) protocol) or the use of a secondary communication channel that is already secure or considered secure because of its physical properties (for example Ethernet wires for IEEE 802.11 access points or Near Field Communication (NFC)).

However, existing pairing mechanisms can be difficult to use, and may increase significantly the requirements placed on the devices, which mean that it is difficult to implement them successfully in commercial products. This means that many deployments are insecure. For example, IEEE 802.11 networks may be implemented without encryption, with the result that communications between two devices can potentially be overheard, and/or tampered with, by third parties. In other cases, a wireless device may be provided with a USB connector for the sole purpose of performing the pairing operations, which increases the cost of the device unnecessarily.

Many of these disadvantages with pairing mechanisms are also present in wired networks in which the host device is connected directly or indirectly to the peripheral device by cabling or other physical connectors.

Therefore, there is a need for a method and apparatus for allowing simple, secure pairing of communications devices that does not require the input of symbols nor a secondary secure communication channel.

According to a first aspect of the invention, there is provided a method of pairing a trusted device and a second device, the method comprising receiving a request to pair the second device with a first device; mutually authenticating the first device and the second device and obtaining from said first device a device identification relating to said first device; putting the first device into a trusted mode in which it will not engage in a pairing procedure with any device other than the second device; obtaining a device identification from the trusted device; comparing the device identification from the trusted device with the device identification obtained in the authenticating step; if the device identification relating to the first device matches the device identification obtained from the trusted device, determining that the first device is the trusted device and sending a pairing acceptance to the trusted device; and pairing the trusted device and the second device in response to the receipt of a second pairing acceptance from a user entered into the trusted device.

According to a second aspect of the present invention, there is provided a peripheral communications device, comprising means for authenticating the peripheral device to a host device, and transmitting a peripheral device identification to said host device; means for authenticating the said host device to the peripheral device, and receiving said host device identification; means for putting the peripheral device into a trusted mode in which it will not engage in a pairing procedure with any device other than said host device; means for receiving a pairing acceptance input from a user and for confirming pairing with said host device in response to the pairing acceptance input.

According to a third aspect of the present invention, there is provided a host communications device, comprising means for receiving a request to pair said host device with a peripheral device; means for authenticating the peripheral device and obtaining from said peripheral device a device identification relating to said peripheral device; means for authenticating to the peripheral device and transmitting a host device identification to said peripheral device; means for displaying the device identification relating to said peripheral device; and means for pairing the host and peripheral communications devices in response to the receipt of a pairing confirmation from the peripheral device and a host pairing acceptance from the user entered into the host device.

According to a fourth aspect of the invention, there is provided a host communications device, comprising means for receiving a request to pair said host device with a peripheral device; means for authenticating the peripheral device and obtaining from said peripheral device a device identification relating to said peripheral device; means for authenticating to the peripheral device and transmitting a host device identification to said peripheral device; means for obtaining a device identification relating to a trusted device; and means for comparing the device identification relating to the peripheral device and the device identification relating to the trusted device; means for pairing the host and peripheral devices in the event that the device identification relating to the peripheral device and the device identification relating to the trusted device match, and in response to the receipt of a pairing confirmation from the peripheral device.

The invention therefore allows device pairing to be performed simply by the user, without requiring significant increases in the manufacturing costs of devices, in particular those devices that are built for applications that would not otherwise require a feature-rich user interface (e.g. a wireless USB "memory key"). As a result, the invention provides a method and apparatus, which allow pairing of relatively inexpensive devices in a straightforward manner. The level of security that is in fact implemented in wireless and wired networks is therefore likely to be increased.

Although the invention will be described herein as being implemented in wireless networks, it will be appreciated that the invention can also be applied to wired networks in which the host device is connected directly or indirectly to the peripheral device by cabling or other physical connectors.

Figure 1:
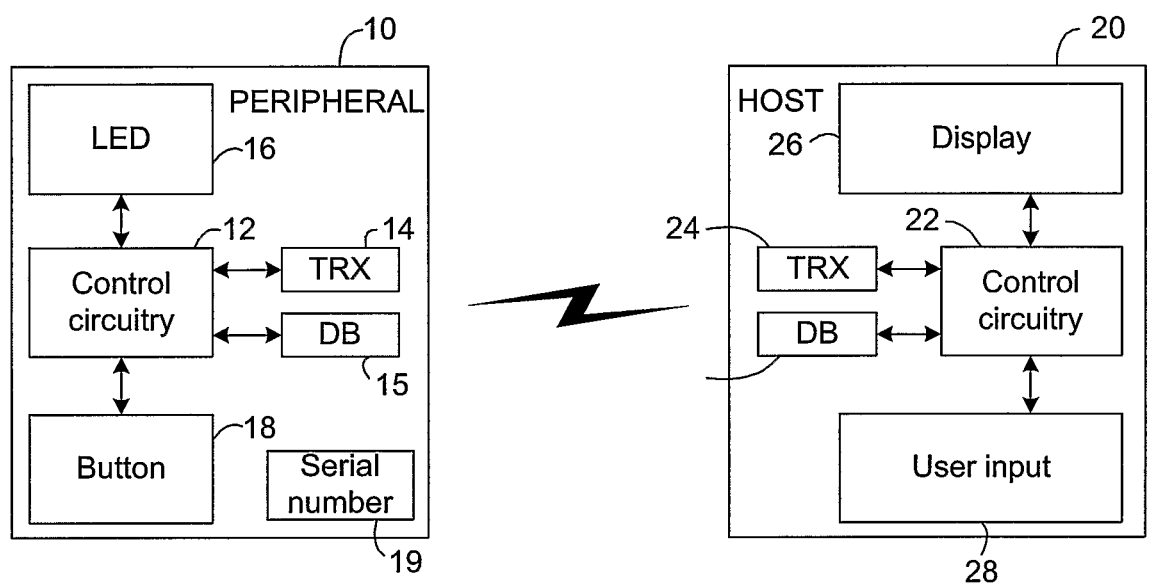
FIG. 1 is a block schematic diagram of an ad hoc wireless communications network, including wireless communications devices in accordance with an aspect of the present invention.

FIG. 1 is a block schematic diagram, showing two electronic devices 10, 20, which have a wireless connection, such that they form an ad hoc wireless network.

In this illustrated embodiment of the invention, the first electronic device 10 is regarded as a peripheral device, while the second electronic device 20 is regarded as a host device. For example, the first electronic device 10 may be a portable memory device, a mobile telephone handsfree kit or a wireless network access point (such as a Wi-Fi Access Point), while the second electronic device 20 may be a camera, mobile telephone or personal computer, and the ad hoc wireless network is formed to allow data to be transferred from the first device 10 to the second device 20. In this case, the ad hoc wireless network is formed by allowing the first device 10 and the second device 20 to communicate according to the Wireless USB (Universal Serial Bus) (WUSB) protocol. However, the first and second devices could communicate according to any wireless or wired protocol, for example such as the IEEE 802.15 and the IEEE 802.11 standard series, Bluetooth, Zigbee, Ethernet or IP.

It will be appreciated that the first and second electronic devices are each potentially complex, and so, for ease of understanding, they will be described here only so far as is necessary for an understanding of the present invention, that is, for an understanding of the method by which the devices are paired to allow secure communications between them.

The peripheral first electronic device 10 has control circuitry 12, in the form of a suitably programmed processor. The control circuitry 12 has other features required for the performance of the primary function of the device 10, but only those features relating to the establishment of device pairing will be described here. The control circuitry 12 is connected to transceiver (TRX) circuitry 14, which handles radio frequency communications with other electronic devices able to use the same wireless protocol.

The control circuitry 12 is also connected to a database (DB) 15, which stores information about devices with which the device 10 has been paired.

Since the first electronic device is relatively simple to operate, it is not provided with a complex user interface. Instead, it is provided with an LED 16, which operates under the control of the control circuitry 12, and a single button 18, which can be pressed by the user to send a signal to the control circuitry 12.

A serial number 19, which uniquely identifies the first electronic device 10, is written on the outside of the device in a user-readable form.

The host second electronic device 20 has control circuitry 22, in the form of a suitably programmed processor. The control circuitry 22 has other features required for the performance of the primary function of the device 20, but only those features relating to the establishment of device pairing will be described here. The control circuitry 22 is connected to transceiver (TRX) circuitry 24, which handles radio frequency communications with other electronic devices able to use the same wireless protocol.

The control circuitry 22 is also connected to a database (DB) 25, which stores information about devices with which the device 20 has been paired.

Since the second electronic device is much more complex than the first, it is provided with a more complex user interface. In this illustrated example, it is provided with a display 26, which operates under the control of the control circuitry 22, and can for example display detailed messages, or menu options, to the user. The second electronic device is also provided with user input 28, which may for example include a keypad, and one or more scroll buttons, allowing the user to select from available menu options, to send a signal to the control circuitry 22.

In the embodiments of the invention illustrated in FIGS. 2 to 7, the user would like to pair the "trusted" host device 20 with a "trusted" peripheral device 10. The host and peripheral devices are considered to be "trusted" if, for example, the user owns the host or peripheral device, and these are the devices that the user wishes to pair together. A third party device that is in range of the host device 20 is therefore not considered to be a "trusted" device.

Briefly, the methods illustrated in FIGS. 2 to 7 provide a means for pairing a first communications device 10 (a peripheral device) and a second communications device 20 (a host device). Firstly, a mutual authentication is performed between the second device and a first device. At this stage, it is possible that the first device with which the second device is communicating is not the first device owned by the user (i.e. it is not the "trusted" device).

Therefore, the methods according to the various embodiments of the invention provide a means by which the user can verify that the first device with which the second device is communicating is indeed the "trusted" device and vice versa. In addition, these methods are robust to various types of attack.

Figure 4:
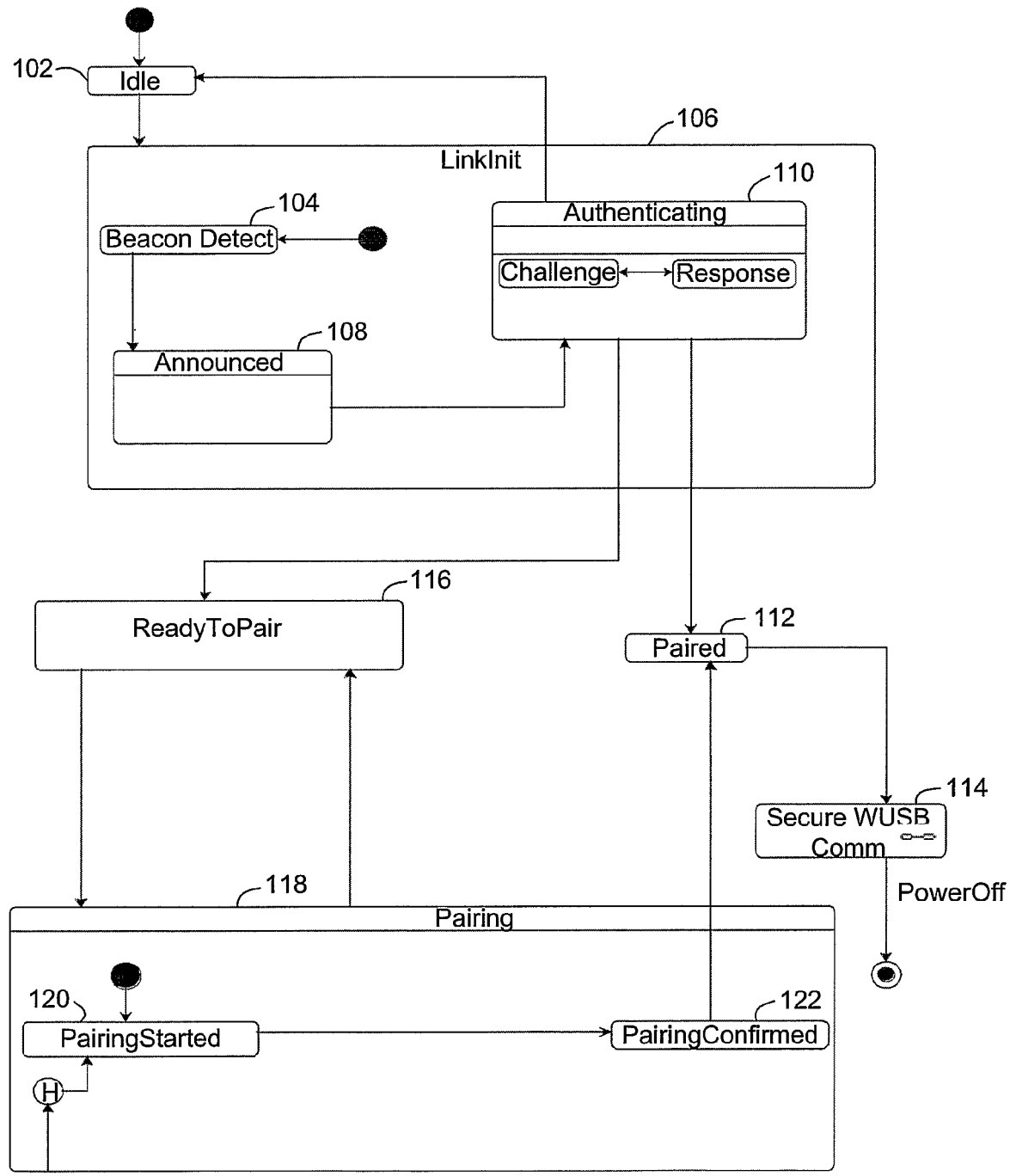
FIG. 4 is a state diagram, illustrating the operation of one of the devices in the network of FIG. 1.
Figure 5:
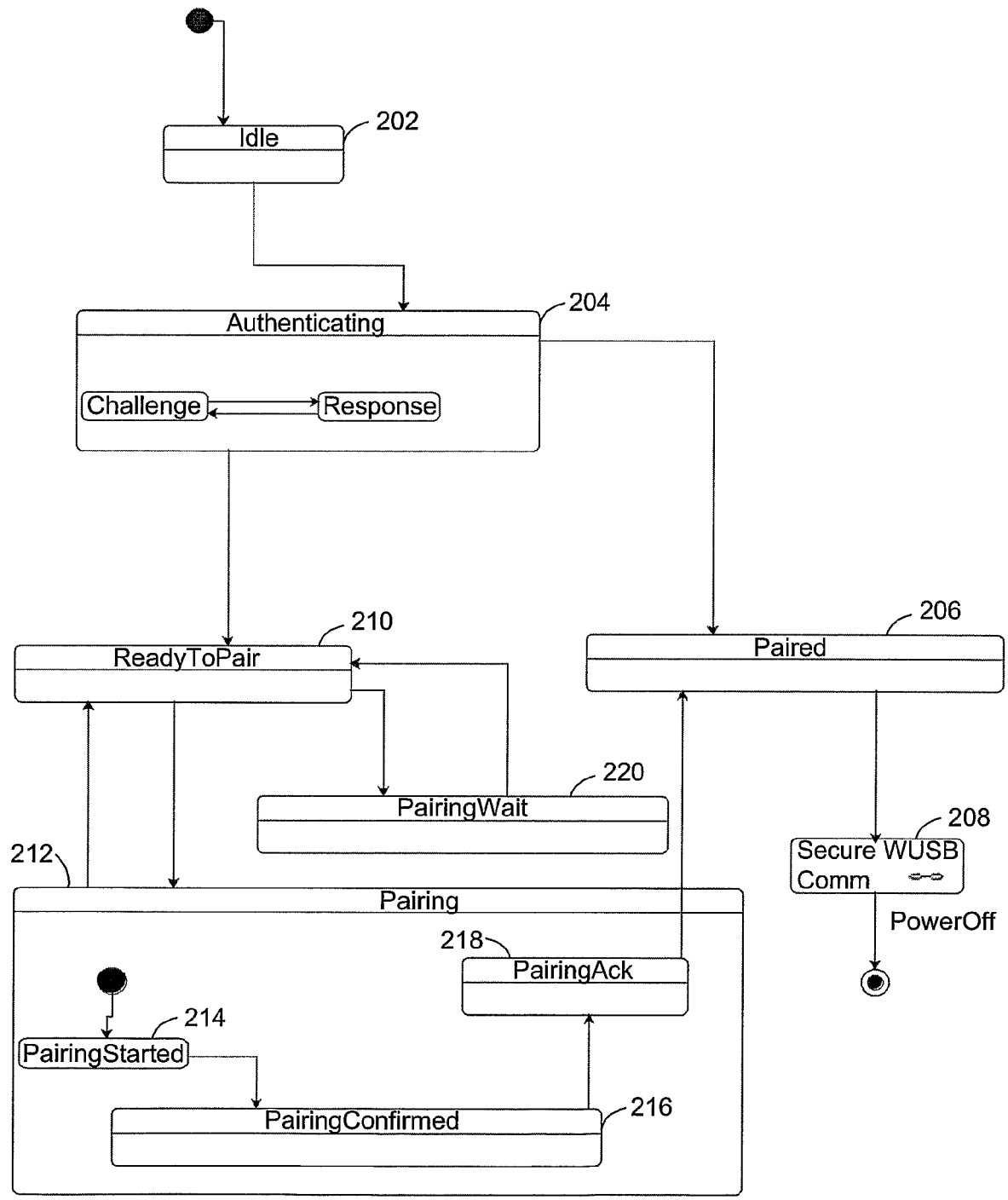
FIG. 5 is a further state diagram, illustrating the operation of the other of the devices in the network of FIG. 1.

The process of pairing the first and second electronic devices 10, 20 according to a first embodiment of the invention will now be described with reference to FIG. 2, which shows the signals sent between the devices, FIG. 3, which shows the procedure performed in the host device 20, FIG. 4, which shows the state of the peripheral device 10, and FIG. 5, which shows the state of the host device 20.

Figure 2:
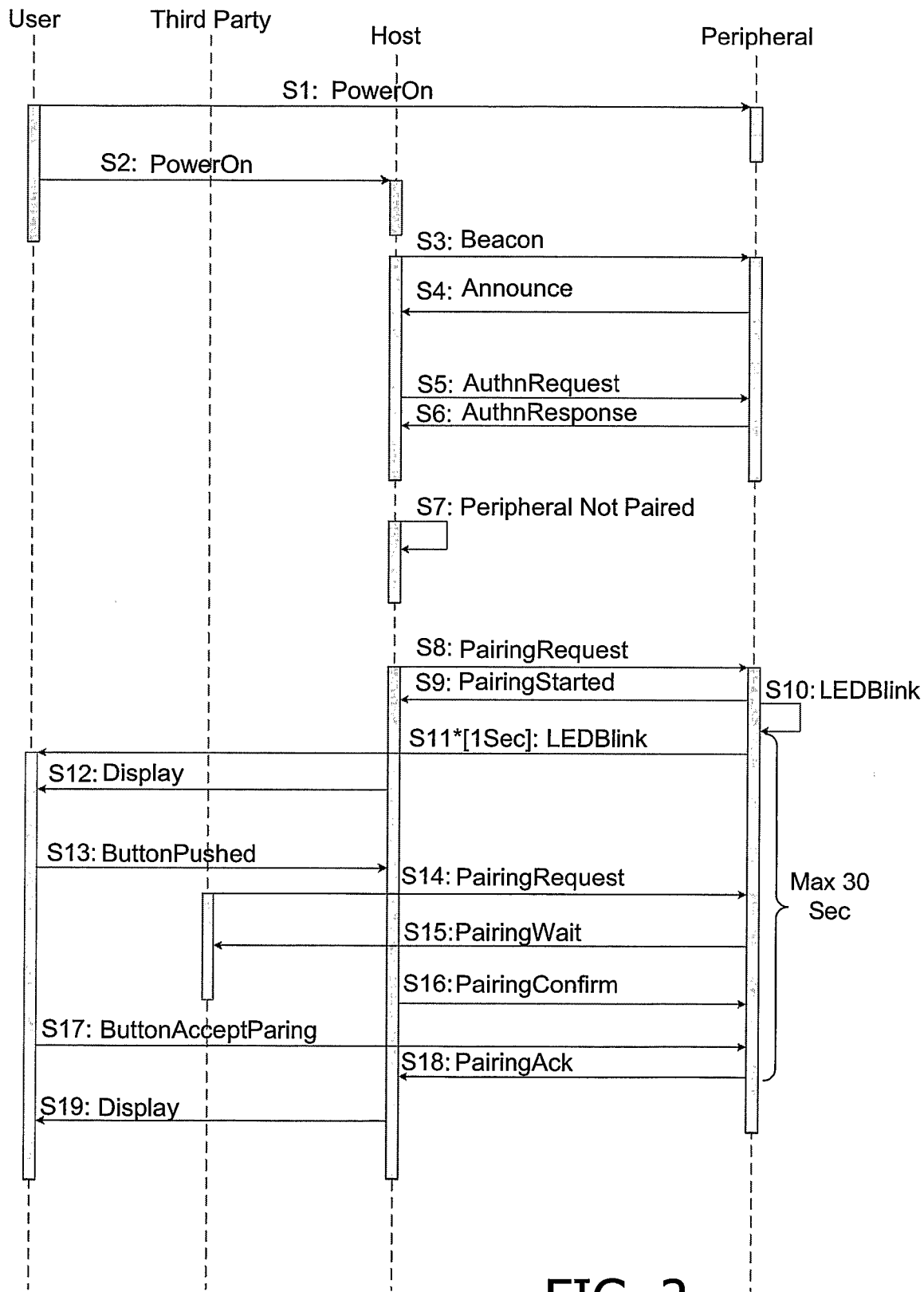
FIG. 2 illustrates a method performed in the network of FIG. 1, according to a second aspect of the present invention.

As shown in FIG. 2, the pairing process may start when the first and second electronic devices 10, 20 have each been powered on (steps S1 and S2 respectively in FIG. 2). Each of the devices then enters its respective Idle state 102, 202.

When the user wishes to establish an ad hoc wireless network between the first and second electronic devices 10, 20, for example in order to be able to transfer data between the two devices, he operates the host device 20 as required in order to control this process. For example, to initiate the process, the user may select a pairing option from a menu, using the user input 28.

Figure 3:
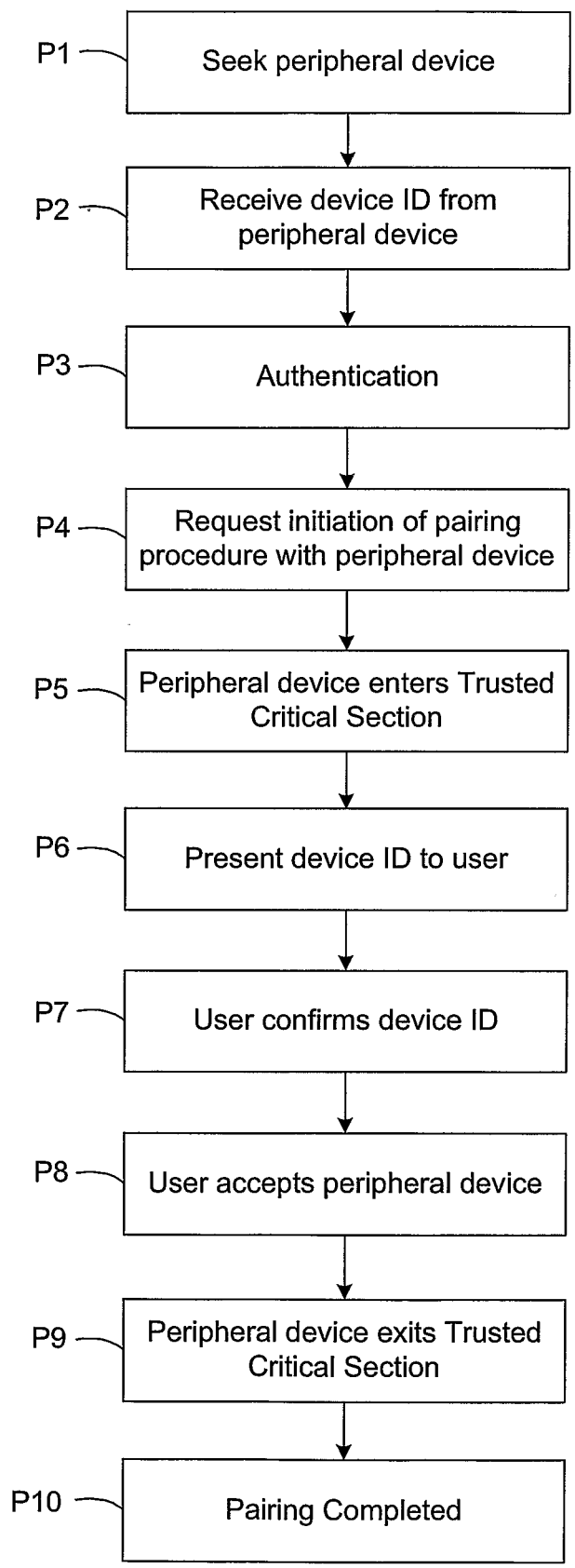
FIG. 3 is a flow chart, further illustrating the method of FIG. 2.

In step P1 of the process in FIG. 3, the host device 20 then seeks a nearby peripheral device. Specifically, it does this by sending a beacon signal (S3 in FIG. 2) containing its identification.

The peripheral device 10 detects the beacon signal, and enters a Beacon Detect sub-state 104 of its Link Initialization state 106. The peripheral device 10 then replies with an announcement (S4 in FIG. 2) containing its identification, and enters its Announced sub-state 108.

The host device 20 receives the peripheral device identification in step P2 of the process in FIG. 3, and then passes to step P3, in which a mutual authentication procedure is performed.

In this illustrated embodiment of the invention, the mutual authentication procedure is a generally conventional cryptographic authentication procedure, based on the use of "public key" cryptography. The first and second devices 10, 20 enter their respective Authenticating states 110, 204. The host device 20 sends an unpredictable challenge (S5 in FIG. 2) to the peripheral device 10. Then the peripheral device 10 processes the challenge by leveraging the knowledge of a private key to generate a response (S6 in FIG. 2), that also includes its own public key information. Finally, the host device verifies the correctness of the response with the conveyed public key uniquely associated to the private key of the peripheral device.

The challenge-response (S5 and S6 in FIG. 2) message interchange is then repeated, with the roles of the host and peripheral devices inverted, to achieve a mutual authentication. It is well known in the art how to piggyback challenges and responses issued by the two devices, in order to minimize the number of messages interchanged, for example according to the STS (Station to Station) protocol, the SSL (Secure Socket Layer) protocol or SSH (Secure Shell) protocol.

It will be appreciated by a person skilled in the art that various different protocols or algorithms can be used to mutually authenticate the devices. Examples of protocols that can be used include EAP-TTLS, EAP-PEAP, STS, Diffie-Hellman or EC/DH. Examples of algorithms that can be used include RSA, DSA or ECDSA.

As is known, device identifications can be associated to public keys by three main techniques. One possibility is to use certificates issued by a trusted authority that binds these two values together (e.g. X509). Another possibility is to perform a cryptographic digest (e.g. SHA-1) of the public key to directly obtain the device identification. A third possibility is to perform a cryptographic digest (e.g. SHA-1) of a document (e.g. X509 certificate) containing the public key.

In this case, the peripheral device 10 associates its printed serial number 19 to its public key when authenticating with the host device 20.

It is also known in the art that the transmitted device identifications can be the result of a random process, for example they can be generated using a random (or pseudo random) number, such that the random process will only generate the same device identification twice with negligible probability.

As a by-product of the authentication procedure, the host device 20 and peripheral device 10 generate a common secret key, that is used to secure all subsequent message interchanges between them.

Once the authentication procedure has been performed, the first and second devices 10, 20 check in their respective paired device databases 15, 25 whether they are in fact already paired with the respective other device. If so, the first and second devices 10, 20 enter their respective Paired states 112, 206, and they are then able to perform secure wireless (or wired) communications (states 114, 208), until such time as one or both of them is powered off.

If, on the other hand, the first and second devices determine that they are not already paired with the respective other device (S7 in FIG. 2), the first and second devices 10, 20 enter their respective Ready to Pair states 116, 210.

In step P4 of the process shown in FIG. 3, the host device 20 requests the initiation of a pairing procedure with the peripheral device 10. Specifically, it sends a pairing request signal (S8 in FIG. 2) to the peripheral device, and the first and second devices 10, 20 enter their respective Pairing states 118, 212. The peripheral device 10 then returns a pairing started signal (S9 in FIG. 2) to the host device 20, and the first and second devices 10, 20 enter their respective Pairing Started states 120, 214.

In this illustrated embodiment of the invention, the LED 16 on the peripheral device 10 then starts to blink, to indicate to the user that pairing is in process (S10 and S11 in FIG. 2). Other simple signaling mechanisms are also possible. At this stage (step P5 in the procedure of FIG. 3), the peripheral device 10 enters a state referred to herein as a "Trusted Critical Section". In the Trusted Critical Section, the first trusted device is guaranteed to communicate only with a specific second device for the purpose of pairing.

In step P6 of the process shown in FIG. 3, the host device 20 presents to the user the identification of the peripheral device 10. Specifically, it displays on the display 26 (S12 in FIG. 2) the identification of the peripheral device. In this illustrated embodiment of the invention, the identification uniquely identifies the peripheral device 10. However, in other embodiments of the invention, the identification could simply identify the peripheral device such that it becomes highly improbable that any other nearby peripheral device could share that identification. For example, the identification can be the result of a hash function performed on the public key of the peripheral device 10.

In this illustrated embodiment of the invention, all that is then required is for the user to compare the device identification 19 physically written on the first device 10 and the device identification displayed on the display 26 of the second device 20, in order to confirm (step P7 in FIG. 3) that the two identifications match. If so, the user accepts the presented device identification (step P8 in FIG. 3), for example by pressing an "OK" key on the user input 28 on the host device 20 (S13 in FIG. 2).

If, for example at this stage, the peripheral device 10 receives a second pairing request signal (S14 in FIG. 2) from a third party's host device, it returns a pairing wait signal (S15 in FIG. 2), and the pairing with the third party's device does not continue.

Otherwise, the host 20 then sends a pairing confirm signal (S16 in FIG. 2) to the peripheral device 10, and presents on its display 26 a message to the user indicating that he can accept the pairing (S17 in FIG. 2) by pressing the button 18 on the first device 10. No further typing of passwords or complicated sequences of symbols will be then necessary. The first and second devices 10, 20 then enter their respective Pairing Confirmed states 122, 216.

The peripheral device 10 then sends a pairing acknowledge signal (S18 in FIG. 2) to the host 20, which enters its Pairing Acknowledged state 218, while the peripheral device 10 exits the Trusted Critical Section (step P9 in the procedure of FIG. 3), and the LED 16 stops blinking.

In step P10 of the process shown in FIG. 3, the pairing procedure is completed, and the first and second devices 10, 20 then enter their respective Paired states 112, 206, and the host device 20 confirms on its display 26 that it is paired with the peripheral device 10 (S19 in FIG. 2). Finally, each of the devices 10, 20 stores the identifier of the other device in its respective paired devices database 15, 25.

As shown in FIG. 2, a timer starts when the first device 10 enters its Pairing Started state 120. If pairing is not completed within a set time period (30 seconds in this case), the first device 10 returns to its Ready to Pair 116, and notifies the second device 20 with a PairingWait message. Upon reception of this message, the second device 20 notifies the user of the condition by means of a message on its display 26, and returns to its Ready to Pair state 210 once the time specified in the PairingWait message (for example 30 seconds) has elapsed.

The security of this pairing protocol thus arises because the user trusts the first device (e.g. because he owns it), and the user trusts the second device (e.g. because he owns it). The result is that the second device does not lie to the user, the first device does not lie to the user, and, in particular, the first device does not lie to the second device.

In an alternative embodiment of the invention, the first electronic device 10 and second electronic device 20 include additional circuitry, separate to the transceiver circuitry 14 and 24 respectively, for allowing communication between the devices over a short-range radio link. This short-range radio link uses a different protocol to the protocol used for the main transmissions between the devices. One such protocol that could be used by this circuitry is that proposed in the Near Field Communication (NFC) Interface and Protocol (NFCIP-1) by ECMA that transmits at 13.56 MHz. In a further alternative embodiment, the second electronic device 20 includes additional circuitry, separate to the transceiver circuitry 24, for allowing communication with an NFC token (for example an RFID tag) in the first electronic device 10.

Figure 6:
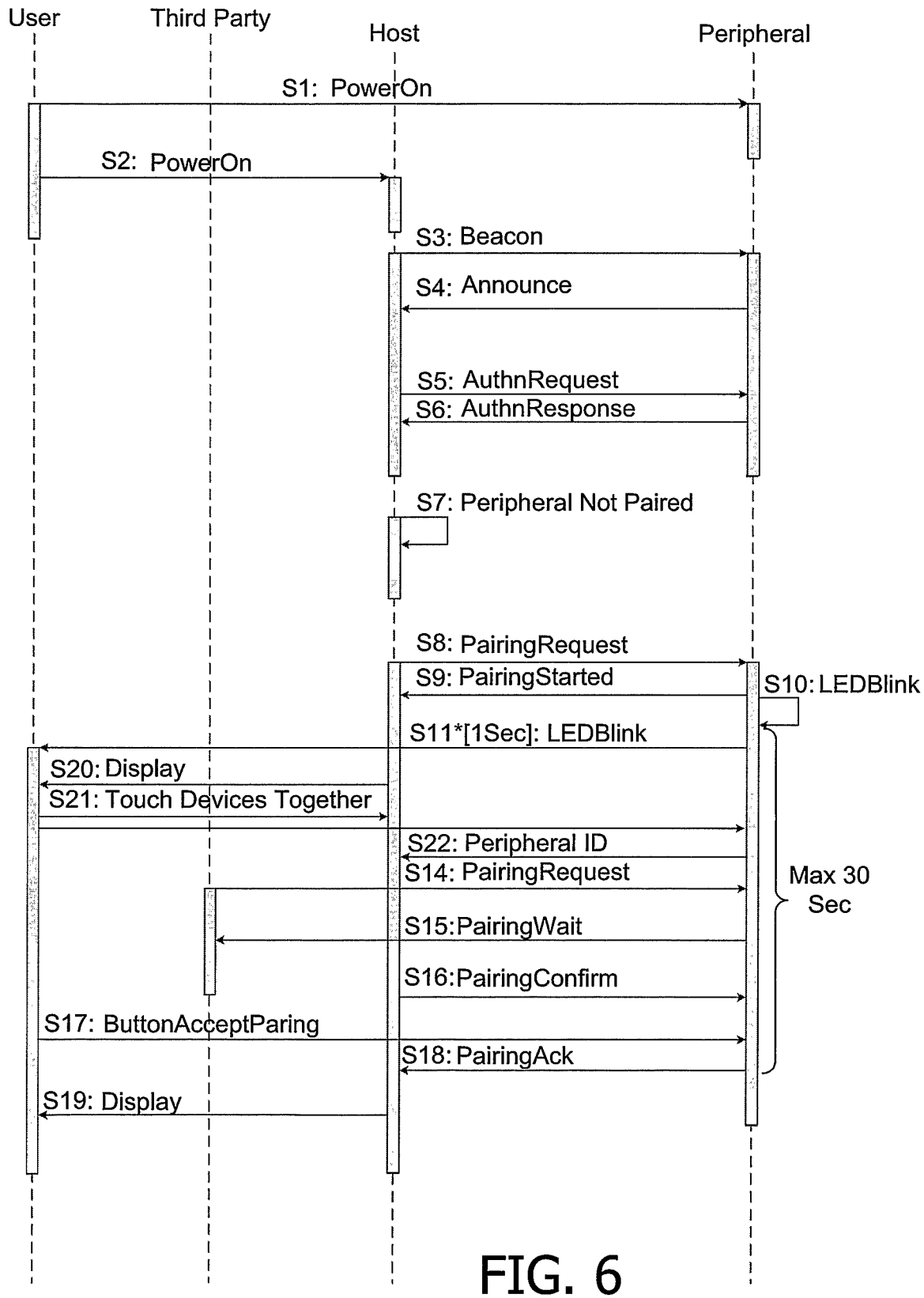
FIG. 6 illustrates a method performed in the network of FIG. 1 according to an alternative embodiment of the invention.
Figure 7:
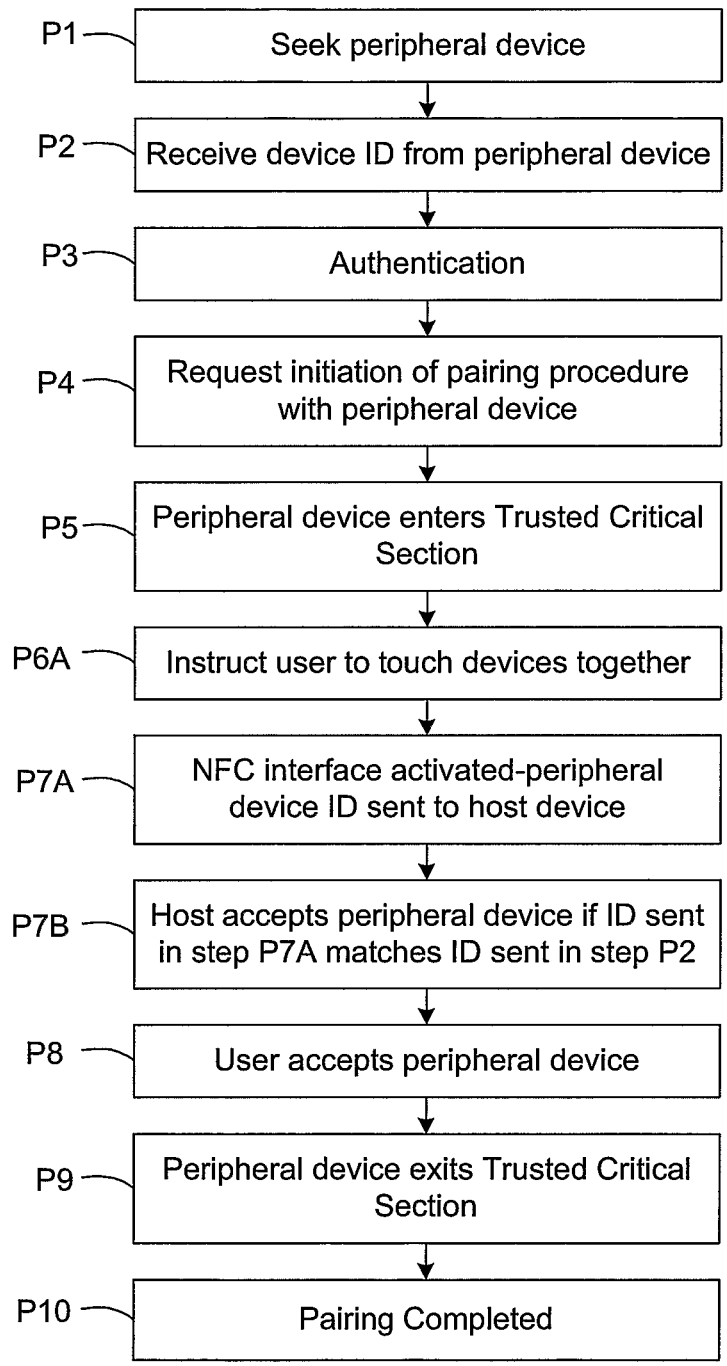
FIG. 7 is a flow chart, further illustrating the method of FIG. 6.

FIGS. 6 and 7 illustrate a method performed in accordance with the alternative embodiment of the invention. Steps S1 to S11 in FIG. 6 and steps P1 to P5 in FIG. 7 are as described above in relation to FIGS. 2 and 3.

After step S11 in FIG. 6 and step P5 in FIG. 7, the first device 10 is in the "Trusted Critical Section" state, in which it is guaranteed to engage in a pairing procedure with only one second device at a time.

In step P6A of the process shown in FIG. 7, the host device 20 presents the user with an instruction to initiate communications between the devices using the alternative protocol. Specifically, if the protocol is an NFC protocol, the device 20 displays on the display 26 (S20 in FIG. 3) an instruction to touch the host device 20 to the trusted peripheral device 10 (i.e. the peripheral device possessed by the user). Alternatively, the host device 20 can be brought sufficiently close to the trusted peripheral device 10 to initiate communications using the NFC protocol.

Once the user has touched the devices or moved the devices sufficiently close together (S21 in FIG. 6 and P7A in FIG. 7), the NFC interface is activated, and the identification of the peripheral device 10 (which was also provided to the second device in step P2 if the first device 10 is indeed the trusted peripheral device) is transmitted to the second device 20 (step S22). This transmission takes place without any interaction by the user, other than touching or moving the two devices together. In the further alternative embodiment, the NFC interface is activated, the signal activates the NFC token which communicates the peripheral device identification to the second device 20.

In this embodiment of the invention, the identification uniquely identifies the peripheral device 10. However, in other embodiments of the invention, the identification could simply identify the peripheral device such that it becomes highly improbable that any other nearby peripheral device could share that identification. For example, the identification can be the result of a hash function performed on the public key of the peripheral device 10.

In this illustrated embodiment of the invention, the second device 20 compares the device identification received in step S22 and P7A with the device identification received from the first device in step P2, in order to confirm (step P7B in FIG. 7) that the two identifications match.

If, for example at this stage, the peripheral device 10 receives a second pairing request signal (S14 in FIG. 6) from a third party's host device, it returns a pairing wait signal (S15 in FIG. 6), and the pairing with the third party's device does not continue.

Otherwise, if the second device 20 determines that the identifications do match, then the second device 20 accepts the first device 10 (step P7B in FIG. 7), and transmits a pairing confirm signal (S16 in FIG. 6) to the peripheral device 10, and presents on its display 26 a message to the user indicating that he can accept the pairing (S17 in FIG. 6) by pressing the button 18 on the first device 10 (step P8 in FIG. 7). No typing of passwords or complicated sequences of symbols is necessary. The first and second devices 10, 20 then enter their respective Pairing Confirmed states 122, 216.

The peripheral device 10 then sends a pairing acknowledge signal (S18 in FIG. 6) to the host 20, which enters its Pairing Acknowledged state 218, while the peripheral device 10 exits the Trusted Critical Section (step P9 in the procedure of FIG. 7), and the LED 16 stops blinking.

In step P10 of the process shown in FIG. 7, the pairing procedure is completed, and the first and second devices 10, 20 then enter their respective Paired states 112, 206, and the host device 20 confirms on its display 26 that it is paired with the peripheral device 10 (S19 in FIG. 6). Finally, each of the devices 10, 20 stores the identifier of the other device in its respective paired devices database 15, 25.

As with the first embodiment of the invention, a timer starts when the first device 10 enters its Pairing Started state 120. If pairing is not completed within a set time period (30 seconds in this case), the first device 10 returns to its Ready to Pair 116, and notifies the second device 20 with a PairingWait message. Upon reception of this message, the second device 20 notifies the user of the condition by means of a message on its display 26, and returns to its Ready to Pair state 210 once the time specified in the PairingWait message (for example 30 seconds) has elapsed.

In order to illustrate the security of the pairing procedure, the reaction of the system to various attempts to attack the procedure will be considered.

In a first possible attack, a third party has a peripheral device of the same type as the user's peripheral device 10. If the third party's peripheral device responds to the beacon signal (S3 in FIG. 2) with its own announcement, and then successfully authenticates with the host device 20, the result would be that, in the first embodiment of the invention at step P6 in the procedure of FIG. 3, it would be the device identification of the third party's peripheral device that would be presented on the display 26 of the host device 20. The user would then be able to reject the proposed pairing, for example by pressing a "NO" key on the user input 28 of the second device 20.

Thus, although it authenticates the third party's device, the user's host device 20 will not lie to the user and so it will present a device identification that does not match the device identification printed on the user's peripheral device 10 (the "trusted" device). Therefore, the user has all the information required to discover the attack and refuse the pairing.

In the alternative embodiment of the invention where the devices use NFC or another short-range radio link, the result of carrying out step P6A in FIG. 7 will be that the identification of the user's peripheral device 10 will be sent to the host device 20. This identification will then be compared with the identification received from the third party's peripheral device in the announce step (S4 in FIG. 6). The host device 20 will determine that the identifications do not match, and will refuse the pairing.

In a second possible attack, a third party has a host device, which may or may not be of the same type as the user's host device 20. At a time when the peripheral device 10 is in its Ready to Pair state 210, but before the pairing request (S8 in FIG. 2 or FIG. 6) is sent from the user's host device 20, the third party's host device initiates the pairing procedure with the peripheral device. In response, the LED 16 of the peripheral device 10 starts blinking, as described above. However, the user's host device 20 can determine that a third party's device is now pairing with the peripheral device, and can indicate this on its display 26, in order to warn the user. Meanwhile, it enters its Pairing Wait state 220. Since the user does not know about this third party's device, he does not press the button 18 on the peripheral device, but instead waits for the LED 16 to stop blinking. When the LED 16 stops blinking, the third party's device is put into "quarantine" by the peripheral device for some time, and the pairing procedure with the user's host device 20 can resume.

Thus, when the user's peripheral device 10 enters the Trusted Critical Section, it will inform the user's host device 20 that it is not available for pairing at that moment by replying with a pairing wait signal, in response to the pairing request signal S8. This is guaranteed because of the trust flow described above. This will allow the user's host device 20 to list the peripheral device 10 on its display 26, while warning the user that the peripheral device 10 is now pairing with a third party's device. Therefore, again, the user has all the information required to discover the condition and refuse the pairing with the third party's device.

In a third possible attack, a third party has a host device, which may or may not be of the same type as the user's host device 20. At a time when the peripheral device 10 is in its Pairing state 212, the third party seeks the user's peripheral device and instructs his own host device to start the pairing process. As described above, the peripheral device 10 receives a second pairing request signal (S14 in FIGS. 2 and 6) from the third party's host device, and returns a pairing wait signal (S15 in FIGS. 2 and 6) in order to refuse the third party's pairing request, and the pairing with the third party's device does not continue.

Thus, these attacks can be rejected, regardless of the exact implementation of the third party's devices.

In order to ensure that the user knows the procedure to follow, in order to prevent a successful attack on the pairing procedure, suitable instructions are provided to the user on the display 26 of the second device 20, such that the user is instructed to manipulate the trusted peripheral device 10 only in response to instructions from the second device 20.

In a further embodiment of the invention, the functionality of the host device described above can be split between two paired devices, a delegator device and a delegatee device, such that the delegator device and delegates device together act as a single host for purposes of pairing the delegator device to a peripheral device.

In this embodiment, the delegator device delegates the responsibility for conducting the pairing procedure between itself and the peripheral device to the delegates device with which the delegator device is already paired. This delegation may be implemented using the RADIUS protocol.

There is thus provided a pairing procedure, which allows secure pairing of two devices, even when one of the devices has the simplest possible user interface, for example with only a single LED as a display, and a single button for user inputs.

The invention claimed is:

1. A method of pairing a host/trusted device and a peripheral device, the method comprising:

sending a beacon signal from the host/trusted device seeking a nearby peripheral device including an identifier of the host/trusted device;

the peripheral device detecting the beacon signal and entering a beacon detect sub-state of a link initialization state;

the peripheral device replying to the beacon signal with an announcement including identification and entering an announced sub-state;

mutually authenticating the host/trusted device and the peripheral device-and obtaining from said peripheral device a device identification relating to said peripheral device identification by associating its printed serial number to the peripheral device's public key and receiving at said peripheral device a device identification relating to said host/trusted device identification;

the first and second device checking their respective paired device databases to determine whether they are already paired with the respective other device;

upon determining that the first and second device are not already paired with the respective other device by checking their respective paired device databases, the host/trusted device requesting a pairing procedure with the peripheral device, the pairing procedure comprising:

a) the host/trusted device sending a pairing request signal to the peripheral device, b) the host/trusted and peripheral device entering into their respective pairing states, c) the peripheral device returning a pairing started signal to the host/trusted device, d) the peripheral device providing a visual indication to a user that pairing is in process, e) the peripheral device entering into a trusted mode in which it will not engage in a pairing procedure with any device other than the first device;

f) the host/trusted device displaying to a user a device identification of the peripheral trusted device, g) the user comparing the displayed device identification displayed on the host/trusted device with the device identification physically written on the peripheral device;

h) the user sending a pairing confirm signal via the first device to the peripheral device in the case where the user confirms that the displayed device identification of the peripheral device matches the device identification written on the peripheral device, i) the peripheral trusted device sending a pairing acknowledge signal to the host/trusted device; and j) pairing the host/trusted device and the peripheral device;

wherein said pairing procedure is terminated if not completed within a pre-determined set time period.

2. A method as claimed in claim 1, wherein the step of obtaining a device identification from the host/trusted device comprises a user reading a device identification printed on the host/trusted device; and wherein the step of comparing comprises a user visually comparing the device identification relating to the host/trusted device that is displayed on said peripheral device and said device identification printed on the host/trusted device.

3. A method as claimed in claim 1, wherein the step of obtaining a device identification from the host/trusted device comprises:

activating a short range radio link between the host/trusted device and the peripheral device; and transmitting the device identification of the host/trusted device to the peripheral device.

4. A method as claimed in claim 3, wherein the step of activating the short range radio link comprises physically touching the second device to the host/trusted device.

5. A method as claimed in claim 3, wherein the short range radio link uses a Near Field Communication protocol.

6. A method as claimed in claim 3, wherein the device identification of the host/trusted device is stored in a RFID tag.

7. A method as claimed in claim 1, wherein the step of activating the short range radio link comprises moving the second device close to the host/trusted device.

8. A method as claimed in claim 1, wherein the host/trusted device and the peripheral device:
establish a common secret key after or during the mutual authentication;
use the shared common secret key to ensure the authenticity and sequencing of subsequent messages between the host/trusted device and the peripheral device.

9. A method as claimed in claim 1, wherein the pairing acceptance comprises a single keypress on the host/trusted device.

10. A method as claimed in claim 1, further comprising, after putting the host/trusted device into the trusted mode, notifying the peripheral device that the host/trusted device will pair exclusively with the peripheral device while host/trusted device is in the trusted mode.

11. A method as claimed in claim 1, the method further comprising:
in response to receiving said request to pair the host/trusted device and peripheral device, transmitting a beacon signal from said peripheral device, wherein said beacon signal indicates the identification of said peripheral device; and
in response to receiving said beacon signal from said peripheral device, transmitting a response signal from said host/trusted device.

12. A method as claimed in claim 11, wherein the identification of said peripheral device in said beacon signal is unique.

13. A method as claimed in claim 12, wherein said unique identification of said peripheral device can be directly computed from the said peripheral device authentication.

14. A method as claimed in claim 11, further comprising generating said identification of said peripheral device by means of a random process.

15. A method as claimed in any preceding claim, the method further comprising after authenticating said host/trusted device, indicating on said host/trusted device that said host/trusted device is in a pairing procedure.

16. A method as claimed in claim 15, comprising indicating on said host/trusted device that said host/trusted device is in a pairing procedure, by means of a light on said host/trusted device.

17. A method as claimed in claim 1, wherein said device identification uniquely identifies said host/trusted device.

18. A method as claimed in claim 17, comprising generating said identification of said host/trusted device by means of a random process.

19. A method as claimed in claim 17, wherein said device identification can be directly computed from the said host/trusted device authentication.

20. A method as claimed in claim 1, further comprising establishing a secure ad hoc wireless communications network between said host/trusted and second devices.

21. A method as claimed in claim 20, comprising establishing a wireless USB connection between said host/trusted and second devices.

22. A peripheral communications device, comprising:
means for detecting a beacon signal and entering a beacon detect sub-state of a link initialization state;
means for replying to the beacon signal including an identifier of a host/trusted device, with an announcement including an identification and entering an announced sub-state;
means for authenticating the peripheral device to a host/trusted device by associating the peripheral device printed serial number to the peripheral device's public key, and transmitting a peripheral device identification to said host/trusted device;
means for authenticating the said host/trusted device to the peripheral device, and receiving said host/trusted device identification;
means for checking a paired device database to determine if said peripheral communication device is already paired with the host/trusted device;
upon determining that the peripheral communications device is not already paired with the host/trusted device:
means for putting the peripheral device into a trusted mode in which it will not engage in a pairing procedure with any device other than said host/trusted device;
means for determining if said peripheral device has been placed in said trusted mode within a predetermined set time period;
means for receiving a pairing acceptance input from a user and for confirming pairing with said host device in response to the pairing acceptance input.

23. A peripheral device as claimed in claim 22, wherein the peripheral device further comprises a second means for transmitting the peripheral device identification to the host/trusted device, the second means using a short range radio link.

24. A peripheral device as claimed in claim 23, wherein the short range radio link uses a Near Field Communication protocol.

25. A peripheral device as claimed in claim 23, wherein the second means comprises a RFID tag.

26. A peripheral device as claimed in claim 22, wherein said peripheral device further comprises:
means for establishing a common secret key with said host/trusted device after or during the authentication with the said host/trusted device;
means for producing messages with the said secret key whose authenticity, integrity and sequencing can be verified by the said host/trusted device;
means for verifying the authenticity, integrity and sequencing of the messages produced by the hosts/trusted device with the said secret key.

27. A peripheral device as claimed in claim 22, wherein said peripheral device identification uniquely identifies said peripheral device.

28. A peripheral device as claimed in claim 22, wherein said peripheral device identification is a result of a random process.

29. A peripheral device as claimed in claim 28, wherein said random process will only generate the same peripheral device identification twice with negligible probability.

30. A peripheral device as claimed in claim 22, the peripheral device comprising means for receiving a beacon signal from said host/trusted device, and transmitting a response signal.

31. A peripheral device as claimed in claim 22, the peripheral device comprising means for indicating that said host/trusted device is in a pairing procedure, after completing said authentication.

32. A peripheral device as claimed in claim 31, wherein said means for indicating comprises a light on said peripheral device.

33. A peripheral device as claimed in claim 22, adapted for establishing a wireless USB connection with said host/trusted device.

34. A peripheral device as claimed in claim 22, adapted for establishing an Internet Protocol connection with said host/trusted device.

35. A peripheral device as claimed in claim 22, wherein the pairing acceptance input from a user comprises a single keypress.

36. A host communications device, comprising:
means for receiving a request to pair said host device with a peripheral device;
means for authenticating the peripheral device based in part on the public keys of the host and peripheral devices, and obtaining from said peripheral device a device identification relating to said peripheral device;
means for authenticating to the peripheral device and transmitting a host device identification to said peripheral device;
means for checking a host communications paired device database to determine if said host communications device is already paired with the peripheral device;
upon determining that the host communications device is not already paired with the peripheral device:
means for obtaining a device identification relating to a trusted device; and
means for comparing the device identification relating to the peripheral device and the device identification relating to the trusted device;
means for pairing the host and peripheral devices in the event that the device identification relating to the peripheral device and the device identification relating to the trusted device match, and in response to the receipt of a pairing confirmation from the peripheral device, and
means for determining if said pairing is completed within a predetermined set time period.

37. A host communications device, comprising:
means for sending a beacon signal to a nearby peripheral device, said beacon signal including an identifier of the host device;
means for receiving a request to pair said host device with a peripheral device;
means for authenticating the peripheral device using the peripheral device's public key and obtaining from said peripheral device a device identification relating to said peripheral device;
means for authenticating to the peripheral device and transmitting a host device identification to said peripheral device;
means for checking a host communications paired device database to determine if said host communications device is already paired with the peripheral device;
upon determining that the host communications device is not already paired with the peripheral device:
means for displaying the device identification relating to said peripheral device; and
means for pairing the host and peripheral communications devices in response to the receipt of a pairing confirmation from the peripheral device and a host pairing acceptance from the user entered into the host device, and
means for determining if said pairing is completed within a predetermined set time period.

38. A host device as claimed in claim 37, wherein the means for obtaining comprises a means for establishing a short range radio link with the peripheral device.

39. A host device as claimed in claim 38, wherein the short range radio link uses a Near Field Communication protocol.

40. A host device as claimed in claim 37, wherein said host device further comprises:
means for establishing a common secret key with said peripheral device after or during the authentication with the said peripheral device;
means for producing messages with the said secret key whose authenticity, integrity and sequencing can be verified by the said peripheral device;
means for verifying the authenticity, integrity and sequencing of the messages produces by the peripheral device with the said secret key.

41. A host device as claimed in claim 37, wherein in response to receiving said request to pair the host and peripheral devices, said host device is adapted to transmit a beacon signal, wherein said beacon signal indicates the identification of said host device.

42. A host device as claimed in claim 37, wherein said device identification uniquely identifies said peripheral device.

43. A host device as claimed in one of claim 37, wherein said peripheral device identification is a result of a random process.

44. A host device as claimed in claim 43, wherein said random process will only generate the same peripheral device identification twice with negligible probability.

45. A host device as claimed in claim 37, wherein said host device identification uniquely identifies said host device.

46. A host device as claimed in claim 37, adapted for establishing a secure wireless USB connection with said peripheral device.

47. A host device as claimed in claim 37, adapted for establishing an Internet Protocol connection with said peripheral device.

48. A host device as claimed in claim 37, wherein the host device comprises a delegator device and a delegatee device, wherein the delegator device is adapted to forward a request to pair said host device with a peripheral device to the delegatee device, and wherein the delegatee device is adapted to perform at least a part of the pairing procedure on behalf of the delegator device.

* * * * *